Sept. 13, 1927.
B. R. FAUNCE
ALARM GAUGE
Filed Oct. 2, 1923
1,642,434
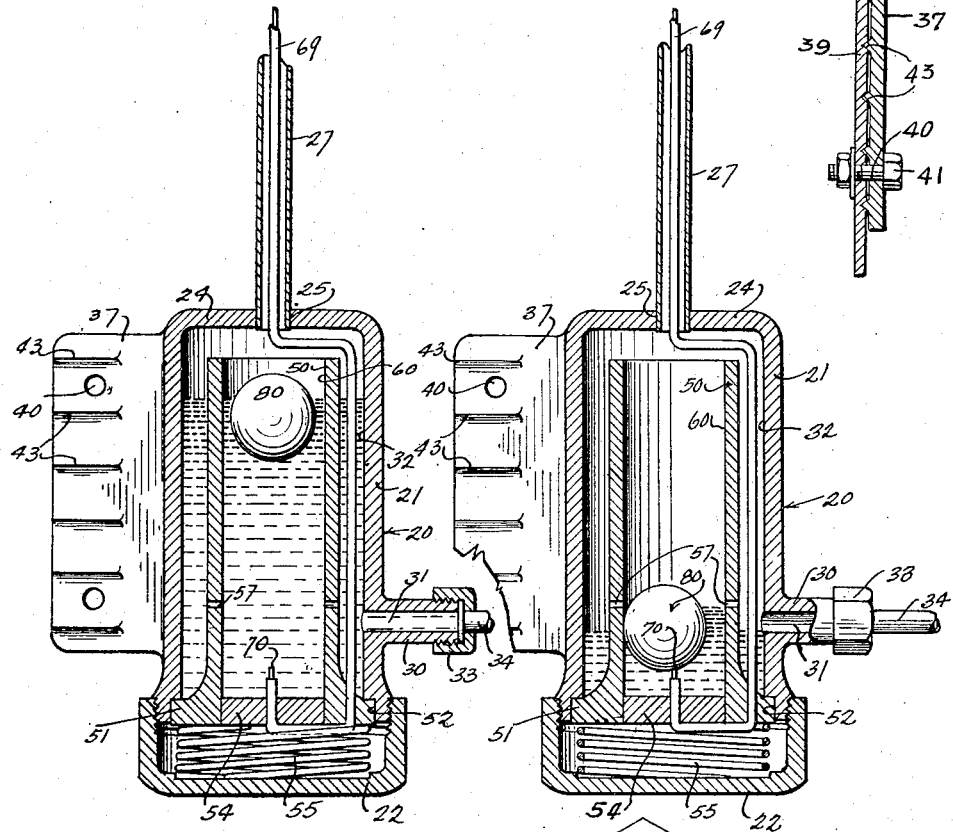
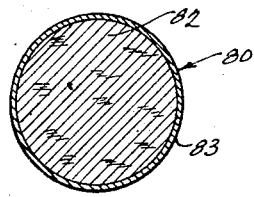

Patented Sept. 13, 1927.

1,642,434

UNITED STATES PATENT OFFICE.

BENJAMIN RICE FAUNCE, OF RIVERSIDE, NEW JERSEY.

ALARM GAUGE.

Application filed October 2, 1923. Serial No. 666,106.

This invention relates to improvements in alarm gauges.

The primary object of the invention is to provide an alarm which will give a signal to a vehicle operator when the fuel of the supply tank is at a low level.

A further object of this invention is the provision of an electrically operated alarm gauge which may be safely used in connection with explosive liquids, such as gasoline.

A very important object of the invention is the provision of an electrical circuit controlled alarm gauge of the above mentioned character embodying a float controlled switch mechanism which may only be closed below the liquid fuel level.

A further object of this invention is the provision of a novel circuit operating float member.

A further object of this invention is the provision of a novel type of float housing construction for alarm gauges.

Other objects and advantages of this invention will be apparent during the course of the following detailed description.

In the accompanying drawings, wherein similar reference characters designate corresponding parts throughout the several views:

Figure 1 is a cross sectional view, taken through the liquid fuel level and float chamber showing the float as it is positioned when the fuel tank has a sufficient supply of fuel therein, and so that the signal circuit is inoperative.

Figure 2 is a cross sectional view of the construction illustrated in Figure 1, showing the position of the circuit controlling float when the fuel has fallen to a low level, so that the signal circuit is closed.

Figure 3 is a transverse cross sectional view, taken through the float chamber portion of this invention.

Figure 4 is a cross sectional view, taken thru the novel circuit controlling float, showing the novel construction thereof.

Figure 5 is a cross sectional view, showing particularly how the float chamber or housing construction may be supported in a stable position.

In the drawings, wherein for the purpose of illustration is shown but a preferred construction of this invention, the letter may indicate the improved alarm gauge.

The alarm gauge B preferably includes the housing 20, which is of two parts; the cylindrical shaped body 21, and a detachable bottom cap 22. The body 21 has a top wall 24, having an opening 25 therein, into which fits a vent tube 27, which may be connected in the top of the ordinary automobile fuel tank. The lower end of the body 21 is open and externally screw threaded for receiving the detachable cap 22. A tubular projection 30 extends laterally from the body 21 at the lower end thereof, which provides a way 31, in communication with the chamber 32 of the housing 20. This projection may be screw threaded to receive a packing nut or coupling 33, by means of which a tube or pipe line 34, may be connected for feed of fuel into the housing 20, and exit therefrom; the pipe 34 being preferably connected with the liquid supply. An attaching wing 37 is preferably formed integral with the body 21, by means of which the housing 20 may be properly secured to any suitable support 39. Apertures 40 are preferably provided in the wing 37, to receive bolts 41, or the like, as is illustrated in Figure 5 of the drawings. The wing 37 may have substantially V-shaped ridges 43 horizontally provided thereacross, which bite into the support 39 for stably positioning the alarm gauge housing 20.

A casing 50 is provided for detachable positioning within the housing 20, which is open at its top. At its lower end an annular flange 51 is provided, which is adapted for seating in an annular seat 52 which may be provided inwardly of the bottom margin of the housing body 21. A plug 54 is preferably snugly fitted in the lower end of the casing 50, for supporting a contact of a circuit, as will be subsequently set forth. The casing 50 is of less diameter than the internal diameter of the housing body 21, being spaced therefrom, as is indicated in Figures 1 and 2 of the drawings.

A spiral spring 55 is normally under compression between the cap nut 22 and the bottom of casing 50, and urges the latter upwardly so that the flange 51 thereof is snugly disposed in its housing seat 52, preferably in a non-leak connection, altho not necessarily so. Relatively small ports or ducts 57 are radially provided in the casing 50; diametrically opposed, and so that they are just above the way 31 of the housing 20, when the casing 50 is in position. It is thus apparent that the chamber 60 of the casing 50 is open to the housing chamber 32 to receive fuel therefrom; both of said chambers having communication with the vent tube 27, so that the fuel level therein may rise and fall with the fuel level of the supply tank not shown.

The device forms a switch for operating an electric circuit wherein a signal may be placed. A conducting wire 69 of the circuit may lead downwardly through the vent tube 27, being suitably carried within an insulated casing. As is shown in Figures 1 and 2 of the drawings, the wire 69 extends downwardly through the chamber 32 of the housing 20, and passes thru an aperture in the casing flange 51, along the bottom of casing 50, and upward thru the plug 54, preferably projecting centrally upward into the chamber 60 of casing 50, and providing an exposed contact 70. This contact 70 is disposed below the ports 57, so that it will always be submerged in the liquid fuel. The circuit is also grounded, through the medium of the housing 20.

A circuit controlling float 80 of novel construction is provided, which in connection with the grounded gauge housing and contact 70 cooperates to provide a switch for the circuit 65. This float 80 preferably comprises a spherical shaped buoyant body 82, such as cork, electroplated, as at 83 to provide a conducting medium for the electric current. The weight of the float 80 is such that it is always submerged at its maximum diameter, and for a short distance thereabove, so that it can only contact the walls of the casing 50 below the liquid level therein.

Referring to the operation of the alarm gauge, the circuit controlling float 80, when there is plenty of fuel in the supply tank, will float free of the contact 70, and normally free of engagement with the walls of casing 50, as is illustrated in Figure 1 of the drawings. When the fuel level in chamber 60 has dropped to the ducts 57, the float 80 will engage the contact 70 and incident to its weight, fall laterally into engagement with the casing 50, thus closing the circuit, and sounding or illuminating to indicate that the fuel supply needs replenishing. It is to be noted particularly that the fuel level in the casing chamber 60 cannot fall below the ducts 57, and that the float 80 engages contact 70 and the casing 50 below the fuel level, thus preventing arcing or a jumping spark. As the ducts 57 are at an elevation above the way 31, the fuel may still feed through the feed line for consumption for a certain period of time after the alarm has been given. The construction of the housing and casing is of particular merit in view of the economy with which it may be manufactured to attain the purposes above outlined.

I claim:

1. A device of the class described comprising a casing, permitting inlet and exit of a liquid with respect to the casing, a circuit controlling float of spherical formation operable in the casing having a specific gravity so that the float at its maximum diameter is always submerged in the liquid, and a contact in insulated relation within said casing, said float upon dropping with the liquid to a predetermined position being adapted to engage said contact and tipped against said casing at points below the liquid level to close a circuit.

2. A device of the class described comprising a casing having a duct therein to permit inlet and escape of liquid with respect thereto, a contact extending upwardly within the casing and terminating at a point below said duct, and a circuit controlling float freely suspended in the casing upon liquid therein shaped and weighted so that the same may engage the casing below the liquid level and is prevented from any contact with the casing above the liquid level, said float being adapted when the liquid level has fallen substantially to said duct to engage said contact at a point below the liquid level for closing said circuit and upon further falling of the liquid level to said duct adapted to be tipped incident to the weight thereof laterally into engagement with said casing at a point below the liquid level for closing a circuit.

3. In an alarm gauge the combination of a casing adapted to receive a volatile liquid having a compartment therein with a duct above the bottom of said compartment through which the liquid may inlet and exit, a circuit controlling float of spherical formation operable in the compartment of the casing, having a specific gravity so that the same at its maximum diameter is always submerged in the liquid below the level thereof, and contact means in the casing compartment entirely below the duct thereof spaced in a definite relation with the float whereby when the liquid level has dropped to said duct the said float will then engage said contact means entirely below the level of the liquid for closing a circuit.

4. An alarm gauge comprising a housing including a body portion having a lateral port therein and a vent opening, and a detachable bottom cap; a casing for disposition upwardly in the body portion of said housing having lateral ports therein and a vent opening, a spring between the casing and cap of the housing to normally retain the casing in position, a circuit controlling float operable in the casing, and a contact in the casing below the ports therein.

5. An alarm gauge comprising a housing having passageway means therein to permit entrance and exit of liquid directly thereinto and therefrom, a casing carried in fixed relation within the housing having port means therein located above the level of the passageway means of said housing and through which port means the liquid may pass from the housing to the inside of the casing and vice versa, said casing below said port means being closed so that the lowest liquid level in said casing occurs at said port means, contact means, and a circuit controlling float operable in the casing responsive to rise and fall of liquid level therein to engage the contact means and close a circuit when the liquid levels in the housing and casing are both even with the port means, whereby a quantity of liquid in the housing may feed through the passageway means thereof notwithstanding the liquid in the casing is already at lowest level.

BENJAMIN RICE FAUNCE.